United States Patent [19]

Marangoni

[11] 3,994,653

[45] Nov. 30, 1976

[54] MACHINE FOR MOLDING AND CURING TREAD RINGS FOR PNEUMATIC TIRES

[76] Inventor: Carlo Marangoni, Via Bellavista 22, Roverto, (Trento), Italy

[22] Filed: Feb. 26, 1976

[21] Appl. No.: 661,684

[30] Foreign Application Priority Data

Apr. 7, 1975  Italy .................................. 22055/75

[52] U.S. Cl. ................................. 425/374; 425/335; 425/340; 425/384; 425/394
[51] Int. Cl.² ...................... B29C 3/04; B29H 5/22; B29H 7/00
[58] Field of Search ........... 425/335, 340, 343, 363, 425/374, 383, 384, 394

[56] References Cited
UNITED STATES PATENTS

| | | | |
|---|---|---|---|
| 2,609,568 | 9/1952 | Getchell | 425/385 X |
| 3,121,912 | 2/1964 | Dieckmann | 425/384 X |
| 3,142,091 | 7/1964 | Curtiss | 425/374 X |
| 3,271,504 | 9/1966 | Bergstrom et al. | 425/363 X |
| 3,768,946 | 10/1973 | Matuschke | 425/363 |
| 3,829,271 | 8/1974 | Taylor | 425/384 X |
| 3,852,012 | 12/1974 | Pfeiffer | 425/363 |
| 3,871,810 | 3/1975 | Geyer | 425/374 |

Primary Examiner—J. Howard Flint, Jr.
Attorney, Agent, or Firm—William Anthony Drucker

[57] ABSTRACT

A machine to perform in one single operating cycle the molding and curing of tread rings for pneumatic tires, including a central drum rotating around its own axis and translatable about itself, surrounded by a stationary annular carrying structure, carrying radially a plurality of hydraulic or pneumatic double acting cylinders, each rod of the said cylinders being provided at its end turned towards the drum with a mold carrying platen to which there is fixedly secured the mold which is part of a complete annular form and which is part of a complete annular form and which may radially translate with synchronous movement, either going near or away from the surface of the said central drum.

8 Claims, 6 Drawing Figures

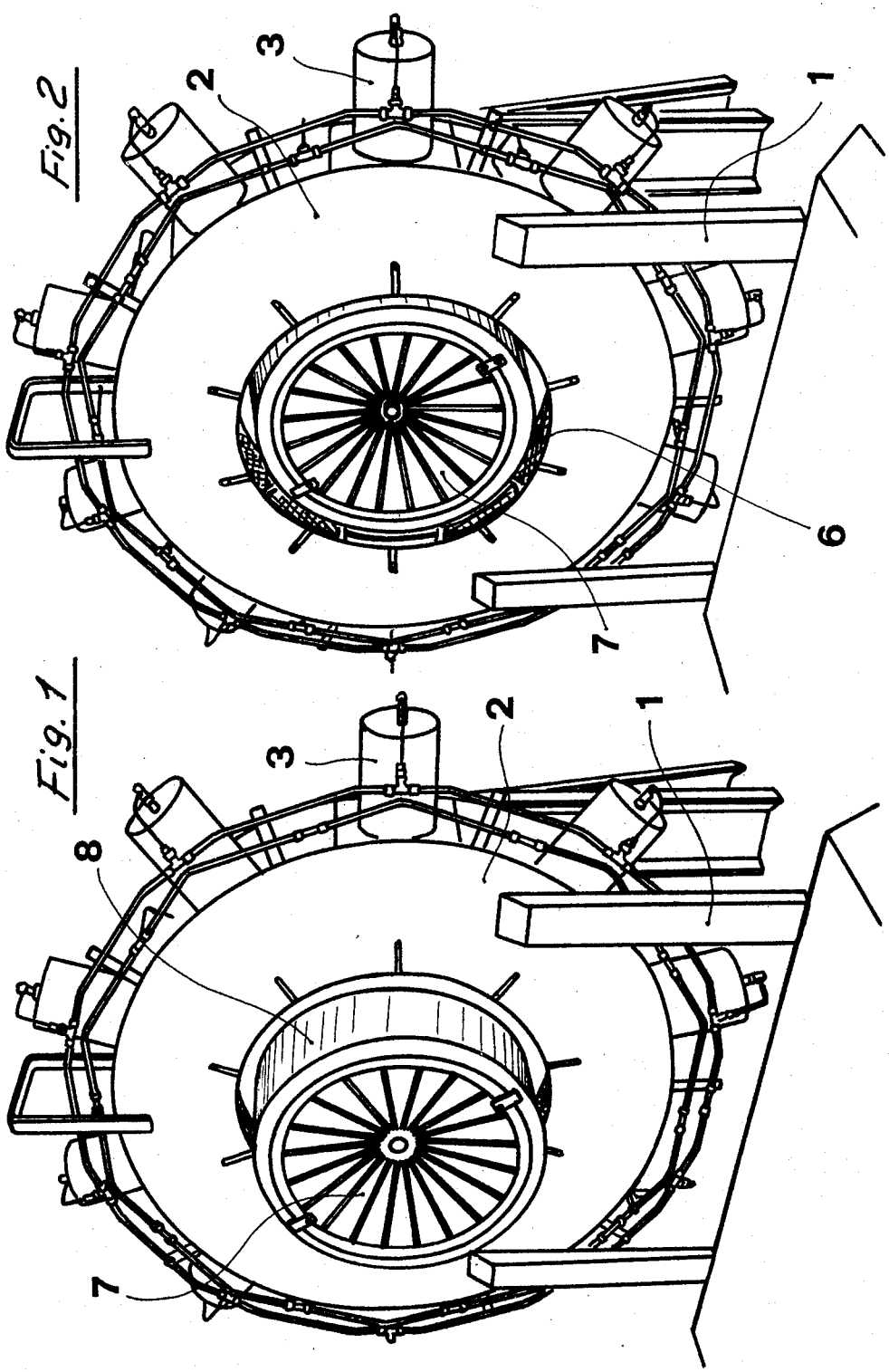

MACHINE FOR MOLDING AND CURING TREAD RINGS FOR PNEUMATIC TIRES

This invention relates to a machine for the molding and curing of tread rings for pneumatic tyres. More particularly, this invention relates to a machine having a circular structure, and designed to carry out in a single operating cycle the molding and curing of tread rings for pneumatic tyres.

As well known, worn out pneumatic tyres, especially if of large size, may be advantageously rebuilt by the application on their carcass of a new tread ring.

At present, the preparation of such tread rings includes two distinct working phases relating to the molding and curing of treads themselves.

More in detail, the molding takes place at first, then the grooving as desired of a continuous rubber band.

Thereafter, such molded band is cut into pieces of appropriate length, which are being connected as the ends so as to built annular members of the desired diameter.

The latter are applied onto the carcass of the pneumatic tyre to be rebuilt and then subjected to a curing process which, as well known, appropriately modifies the chemical-physical characteristics of the rubber.

The main inconvenience encountered in the above-mentioned operating process is given by the fact that connection between the ends of the band is carried out on the already molded band.

This involves imperfections, although to a limited extent, in the continuity of the thread development.

It is, therefore, the object of this invention to provide a machine for the molding and curing of tread rings for pneumatic tyres not showing the above-outlined inconveniences.

Another object of this invention is provide a machine ensuring to carry out a working cycle being more rational and obtaining a more intimate connection between the ends of the ring-like wound band.

These and further objects, which will become more apparent from the following detailed description are obtained by the machine according to this invention, consisting essentially of a stationary annular structures, delimited by two parallel platens of circular crown shape and carrying radially a plurality of hydraulic or pneumatic cylinders. The number of such cylinder is not determining and may be varied at will, and generally comprised, however, between eight and 16. Axially of the said annular structure there is disposed, an axis on which there is mounted a drum rotating loose about the said axis and capable of translating parallel to itself so as to set internally and externally the said annular structure.

Integral with the plasten there is arranged a mold which may be single or dobule mold so as to ensure the simultaneous working of two or more tread rings.

Each mold is substantially constituted by one or more coupled circle arcs with flat or hollow cross transversal development. The said molds may be further provided or not with shoulders or buttresses depending on the grooving which it is desired to operate on the tread ring.

The operating cycle of the machine of this invention consists essentially of the following steps:

a. displacing outside the seat, constituted by the stationary annular structure the rotary drum;

b. disposing onto the said drum by rotation thereof the rubber band to be formed which is being cut at the appropriate moment from a continuous band and connected at the ends;

c. causing the said drum covered with the rubber ring to re-enter the aforementioned annular seat;

d. causing the molds to radially move so as to press against the surface of the ring itself, thereby operating the required grooving.

The molds may be heated so as to operate besides the molding also the curing of the rubber ring.

The surface of the rotary drum may be in turn heated or cooled depending on the requirements of the curing process.

The said drum is further interchangeable in order to be adapted to the diameter of the particular tread ring to be prepared.

The radial movement of the various mold portions may be obtained, other than by means of a double acting cylinders, also through other equivalent mechanical systems.

These and further characteristic features of a functional and constructional nature of the machine of this invention for the molding and curing of tread rings could better be understood from the following detailed description in conjunction with the figures on the accompanying drawings, representing some specific embodiments froms by way of non-limiting examples, in which:

FIG. 1 shows the machine of this invention in a perspective front view, in which the rotary central drum projects from the annular structure;

FIG. 2 shows the machine given in FIG. 1 designed with the rotary central drum disposed inside the annular structure;

Figure 4:
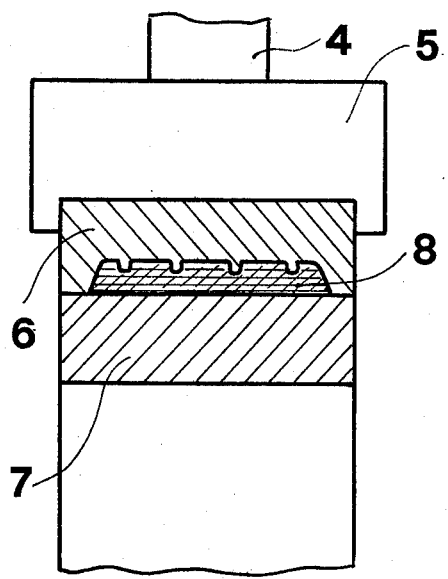
FIG. 4 shows in a schematic view the cross section of the mold carrying device and mold fastened to the rod of one of the cylinders with which the machine of this invention is provided.
Figure 5:
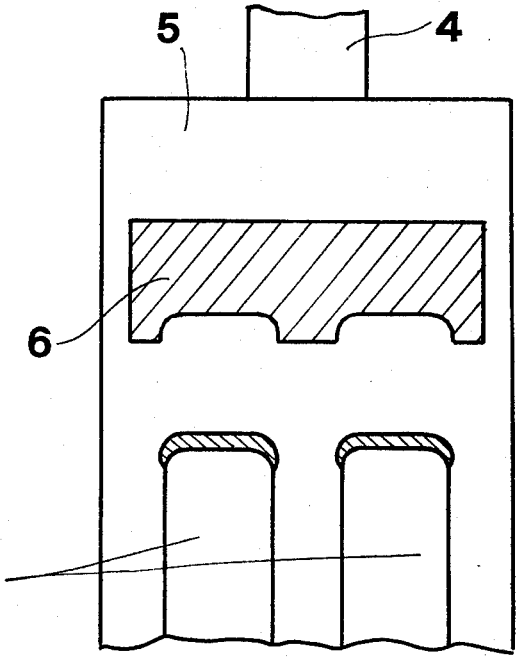
Figure 6:
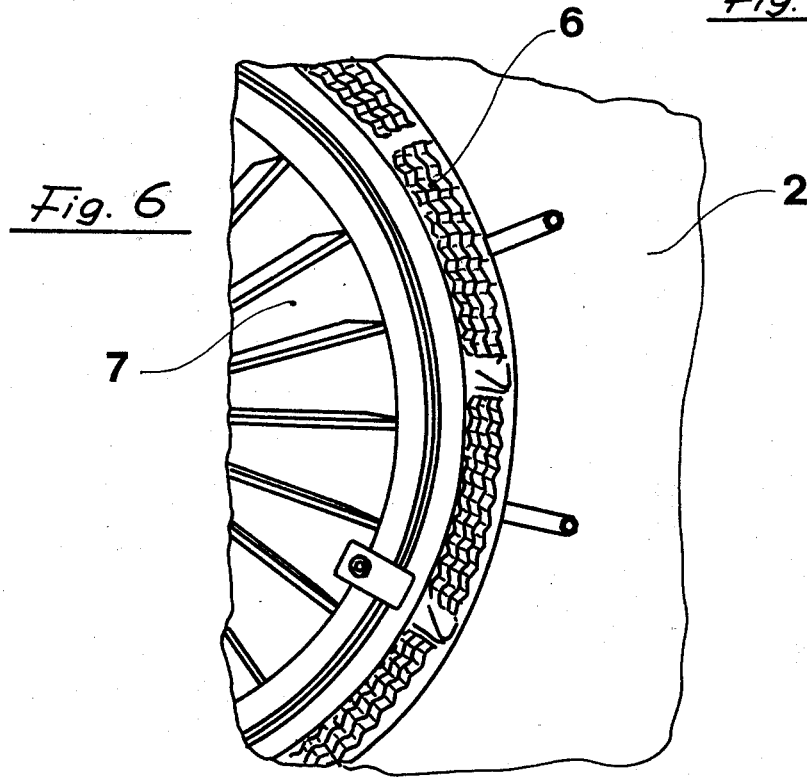

FIG. 5 schematizes the same cross section of FIG. 4 in case of a machine provided with molds arranged alongside each other; and FIG. 6 illustrates a perspective schematic partial view of the mold crown, surrounding the rotary central drum.

Referring now particularly to the numeral symbols given in the various figures on the accompanying drawings, the machine of this invention for the molding and curing of tread rings includes a frame work 1 supporting an annular structure 2.

The said annular structure is substantially formed by a pair of parallel platens, showing the configuration of circular crowns, which delimit a central circular seat of a large diameter than that of the tread ring to be molded and cured.

Between the said platens there are fixed in radial position a plurality of hydraulic or pneumatic double acting cylinders 3 with the centrally turned rods 4.

To each rod 5 there is articulated a mold carrying organ 5. In the figures the number of the cylinders is 10, but such number may be varied depending on the technical requirements. To each mold carrying organ 5 there is fastened a mold 6, which represents a part of a complete annular form, which materializes according to a continuous perimetral line, when all the rods 4 of the different cylinders 3 are in a forward portion towards the middle of the annular structure.

The said mold 6 in particular may show at its molding face a differently shaped relief according to the grooving to be operated on the tread ring.

The said mold 6 may further shows a flat or hollow cross section and be provided or not with shoulders as a function of the individual molding requirements.

By suitably dimensioning the mold carrying organs 5, it is also possible to mount thereon coupled molds 6', adapted to ensure the simultaneous working of more tread rings.

The molds 6 or 6' are conveniently heated so as to operate the simultaneous curing of the tread rings themselves.

Axially of the central seat, defined by the annular structure 2 there is disposed an axis 10 on which there is mounted loose a drum 7 of diameter and thickness being correlated to the dimensions the tread ring.

Figure 3:
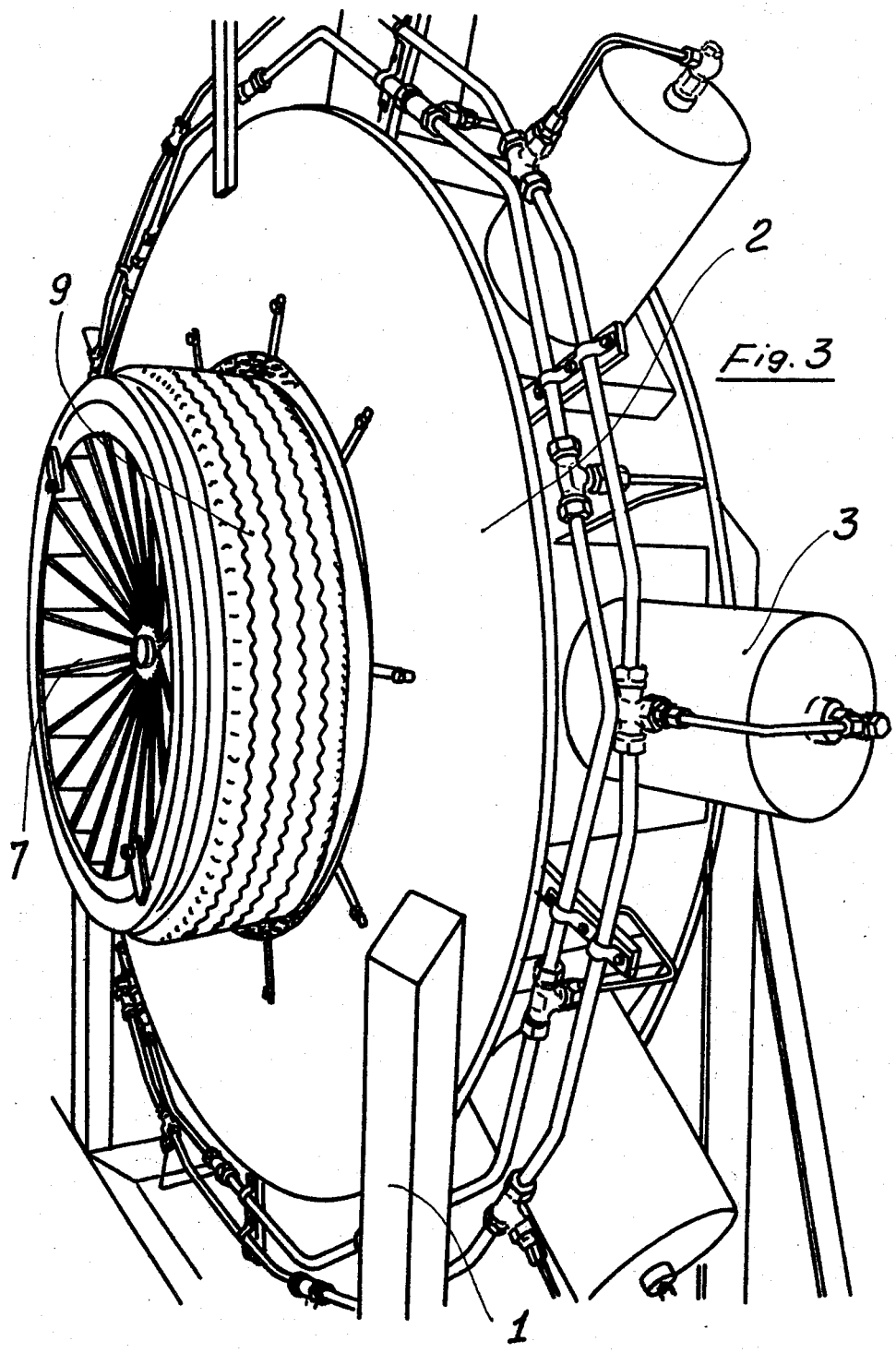
FIG. 3 represents the machine given in the preceding figures illustrated in a perspective front view with the rotary drum projecting from the annular structure and covered with the molded and cured tread ring.

The said 10 supporting the drum 7 may translate parallel to itself so that the drum itself may be fully projecting from the structure 2 - FIG. 1 and FIG. 3 - or fully surrounded by the structure and therefore to the structure itself (FIG. 2).

The said drum 7 may be suitably heated or cooled by means of the well known inside circuits according to the specific requirements of the curing process.

The said drum 7 is further interchangeable so as to be adapted to the diameter of the rubber ring to be molded.

The cycle is the following: the drum 7 is set in a fully projecting position from the structure 2 and a band of prepared rubber 8 is wound on its outer surface, operating a convenient rotation of the drum itself.

Such possibility ensures to operate with rubber bands or strips of any length whatever which are being cut upon the winding onto the drum, thereby obtaining an exactly dimensioned piece being welded at the ends.

Thereafter, the drum 7 is caused to re-enter the seat being delimited by the structure 2 and the rods 4 of the cylinders 3 are lowered so as to compress the various molding sectors 6 on the surface of the ring 8, operating the molding and the curing of the ring itself.

Once the curing has been completed, the cylinders 3 act in opposite sequence, causing the rods 4 to re-enter and thus releasing the drum 7 and the molded and cured ring 9.

The latter is subsequently slipped off the drum itself after prior translation towards the outside of the drum 7 —FIG. 3.

From the foregoing and from perusal of the various figures on the accompanying drawings, one may clearly see the greater functional character and practical application of the machine of this invention for the molding and curing of tread rings for pneumatic tyres.

I claim:

1. A machine to perform in one single operating cycle the molding and curing of tread rings for pneumatic tyres, including a central drum rotating around its own axis and translateable about itself, surrounded by a stationary annular carrying structure, carrying radially a plurality of double acting cylinders; each rod of the said cylinders being provided at its end turned towards the drum with a mold carrying platen to which there is fixedly secured the mold which is part of a complete annular form and which may radially translate with synchronous movement toward and away from the surface of the said central drum.

2. A machine as defined in claim 1, in which the number of the cylinders is comprised between 8 and 16.

3. A machine as defined in claim 1, in which the stationary annular structure is formed by a pair of parallel platens showing the configuration of circular crowns delimiting a circular central seat having a larger diameter than that of the tread ring to be molded and cured.

4. A machine as defined in claim 3, in which the cylinders are fastened between the two parallel platens.

5. A machine as defined in claim 1 in which the mold shows at its molding face a relief shaped according to the desired grooving.

6. A machine as defined in claim 1 in which each mold consists of one at least one circle arc.

7. A machine as defined in claim 1 in which the molds are heated.

8. A machine as defined in claim 1, in which the temperature of the surface of the drum is cooled by means of internal circuits.

* * * * *